H. D. SHAMBERG.
MANUFACTURE OF POWER PLANTS.
APPLICATION FILED JULY 9, 1919.

1,343,485.

Patented June 15, 1920.

INVENTOR
Herbert D. Shamberg
BY
ATTORNEY

UNITED STATES PATENT OFFICE.

HERBERT D. SHAMBERG, OF NEW YORK, N. Y.

MANUFACTURE OF POWER PLANTS.

1,343,485.  Specification of Letters Patent.  Patented June 15, 1920.

Application filed July 9, 1919. Serial No. 309,666.

*To all whom it may concern:*

Be it known that I, HERBERT D. SHAMBERG, a citizen of the United States, residing in the city and State of New York, have invented a new and useful Improvement in the Manufacture of Power Plants, of which the following is a specification.

The invention relates to power plants, and more particularly to electrical generating units, having an internal combustion engine as the prime-mover; and the object is to provide a compact incased structure, having an efficient cooling system for the engine with large storage space for water, and including, also, a fuel-tank in advantageous thermal relation and forming part of the inclosure.

In the accompanying drawings forming a part hereof:

Figure 1:
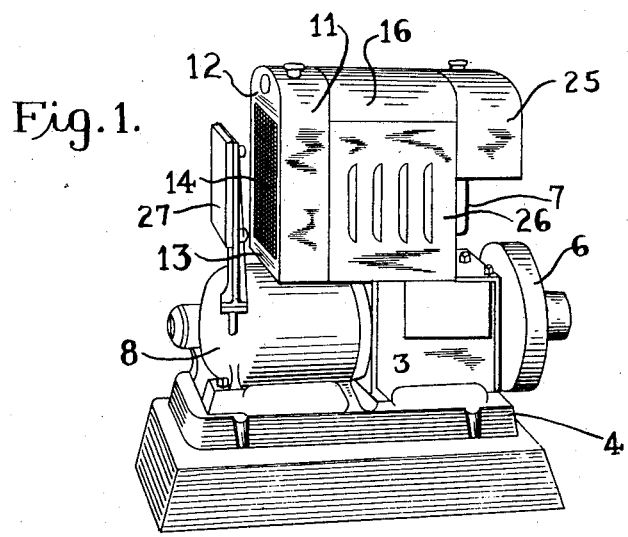
Figure 1 is a perspective view of the unit with the side-closures in place.
Figure 2:
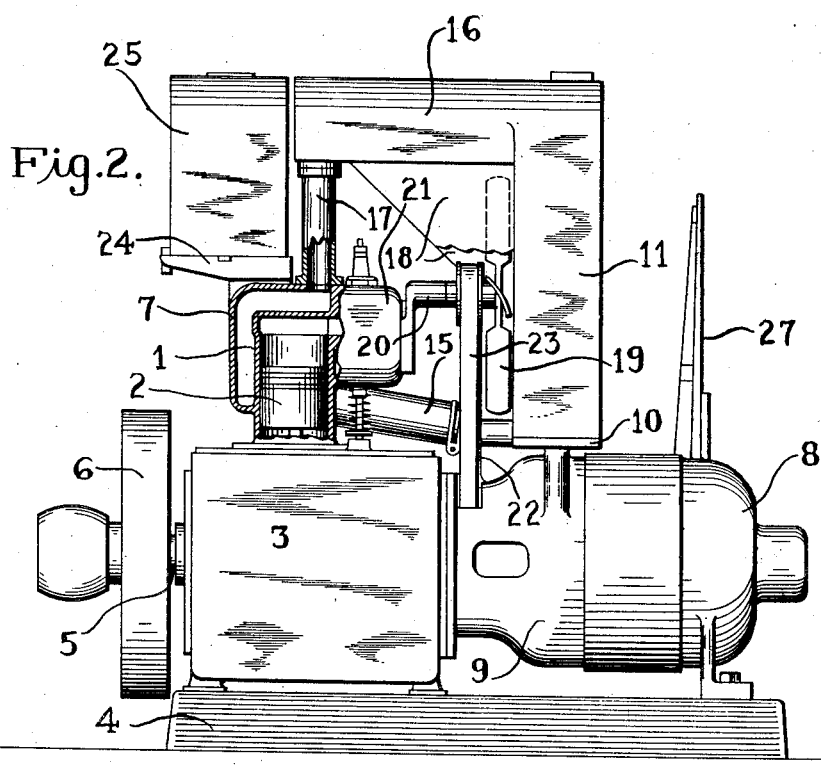
Fig. 2 is a sectional side elevation, on a larger scale, with the side-closures removed.

The internal combustion engine comprises a vertical cylinder 1 with piston 2, and a crank-case frame 3 mounted on a bed-plate 4 and containing the crank-shaft 5 and other operating parts. A fly-wheel 6 is secured to the rear end of the crank-shaft. The cylinder has a water-jacket 7.

An inclosed electrical generator 8 is mounted on the bed-plate in front of the crank-case 3, and is direct-connected with the engine. The portion 9 of the generator casing is contiguous or in continuation with the crank-case.

Formed on the upper part of said generator casing section 9 is a platform 10, which supports a vertical radiator 11, having top and bottom tanks 12 and 13 with intervening honeycomb block 14. A cold-water or return conduit 15 connects the tank 13 of the radiator with the lower part of the engine-jacket space. Extending rearward from the top 12 of the radiator and conforming therewith in its longitudinal lines, is a supplementary, horizontal, transversely-domed water-tank 16, forming a roof over the space behind the radiator and above the engine. The rear bottom portion of this tank is connected with the top of the engine-jacket by a vertical uptake or hot-water pipe 17, the ends of which are attached to fitting openings in the jacket and tank, the uptake connection thus constituting a pillar for the rear of the tank. The said tank is further and largely supported by triangular gusset-plates 18, which are united to the rear side portions of the radiator and to the lower side portions of the tank 16, extending along said tank to points near the pipe 17.

A fan 19, mounted on a bracket 20 on the front of the valve part 21 of the engine-jacket, revolves behind the radiator within a shroud 22, driven by a belt 23 from the main shafting.

A platform 24 is arranged upon the top of the water-jacket, behind the uptake 17, and upon this is secured a fuel-tank 25, from which the engine carbureter (not shown) is supplied. The fuel-tank is directly behind the water-tank 16 and conforms in longitudinal lines therewith and with the radiator 11, the fuel-tank being deeper than the water-tank, though not as deep as the radiator. The space thus included is closed at the sides by a dust-excluding hood comprising a pair of movable or removable side closures 26, which extend between the radiator and the fuel-tank, and from the top water-tank 16 downward over the gusset-plates 18 to or beyond the level of the top of the crank-case.

An instrument-board 27 mounted upon the generator casing, in front of the radiator, serves to support various pieces of electrical apparatus, not shown.

What is claimed as new is:

1. An electrical generating unit comprising an internal combustion engine provided with a water-jacket, an electrical generator direct-connected with the engine, a vertical radiator mounted upon the generator part of the unit and having a cold-water connection with the engine-jacket, and a horizontal supplementary water-tank extending from the top tank of the radiator as a roof over the engine part and having a hot-water connection between its rear portion and the engine-jacket.

2. The combination of an internal combustion engine provided with a water-jacket, a vertical radiator supported in front of the engine and having a cold-water connection with the jacket, a horizontal supplementary water-tank extending rearward from the top tank of the radiator as a roof over the engine, a vertical uptake-pipe between the top of the engine-jacket and the rear portion of said roof-tank, side gusset-plates extending from the radiator along the roof-tank to points near the uptake-pipe, and side closures outside the gusset-plates to close the sides of the space, in rear of the radiator and below the roof-tank.

3. A power unit comprising an internal combustion engine provided with a water-jacket, a vertical radiator supported in front of the engine and having a cold-water connection with the jacket, a horizontal supplementary water-tank extending rearward from the top tank of the radiator as a roof over the engine, a vertical uptake-pipe between the top of the engine-jacket and the rear portion of the roof-tank, a fuel-tank mounted upon the engine-jacket behind said uptake-pipe, and side-closures for the space included between the radiator and fuel-tank and covered by the roof-tank.

HERBERT D. SHAMBERG.